United States Patent
Blasco

(10) Patent No.: US 12,463,665 B2
(45) Date of Patent: Nov. 4, 2025

(54) METHOD FOR TRANSMITTING A CHECK VECTOR FROM A TRANSMITTER UNIT TO A RECEIVER UNIT

(71) Applicant: Deutsches Zentrum für Luft-und Raumfahrt e.V., Bonn (DE)

(72) Inventor: Francisco Lázaro Blasco, Wessling (DE)

(73) Assignee: Deutsches Zentrum für Luft- und Raumfahrt e.V., Bonn (DE)

( * ) Notice: Subject to any disclaimer, the term of this patent is extended or adjusted under 35 U.S.C. 154(b) by 0 days.

(21) Appl. No.: 18/423,543

(22) Filed: Jan. 26, 2024

(65) Prior Publication Data

US 2024/0267058 A1 Aug. 8, 2024

(30) Foreign Application Priority Data

Feb. 2, 2023 (DE) .................. 10 2023 102 529.5

(51) Int. Cl.
*H03M 13/00* (2006.01)
*G06F 16/23* (2019.01)
*H03M 13/15* (2006.01)

(52) U.S. Cl.
CPC .... *H03M 13/1575* (2013.01); *G06F 16/2365* (2019.01); *H03M 13/616* (2013.01)

(58) Field of Classification Search
CPC .......... H03M 13/1575; H03M 13/616; H03M 13/23; G06F 16/2365
See application file for complete search history.

(56) References Cited

U.S. PATENT DOCUMENTS

| | | | | |
|---|---|---|---|---|
| 7,302,628 B2* | 11/2007 | Huang | ................ | H04L 69/04 714/751 |
| 8,230,217 B2* | 7/2012 | He | ................ | H04L 9/3236 713/168 |
| 8,428,379 B2* | 4/2013 | Rane | ................ | H04N 19/395 382/250 |
| 10,558,581 B1 | 2/2020 | Lazier | | |
| 11,736,719 B2* | 8/2023 | Esenlik | ................ | H04N 19/577 375/240.16 |
| 11,822,902 B2* | 11/2023 | Chen | ................ | H03M 13/03 |
| 2007/0071146 A1 | 3/2007 | Scaglione et al. | | |
| 2013/0266078 A1* | 10/2013 | Deligiannis | ................ | H04N 19/152 375/240.25 |
| 2015/0278030 A1 | 10/2015 | Zhu | | |
| 2021/0406116 A1 | 12/2021 | Chella et al. | | |
| 2022/0374407 A1 | 11/2022 | Goyal | | |

OTHER PUBLICATIONS

Guillemot, Christine, et al., "Toward constructive Slepian-Wolf coding schemes". Distributed Source Coding: Theory, Algorithms, and Applications, Elsevier, 2009, pp. 131-156.

* cited by examiner

*Primary Examiner* — Esaw T Abraham
(74) *Attorney, Agent, or Firm* — The Webb Law Firm

(57) ABSTRACT

The invention relates to a method for transmitting a check vector from a transmitter unit to a receiver unit check vector being provided for checking the consistency of a data set. The method includes dividing a data set into a plurality of sections; calculating a hash value for each of the sections, using a hash function; combining the check vector from the calculated hash values; compressing the check vector, the compression being performed using a Slepian-Wolf encoding method; and transmitting the compressed check vector from the transmitter unit to the receiver unit.

13 Claims, 9 Drawing Sheets

METHOD FOR TRANSMITTING A CHECK VECTOR FROM A TRANSMITTER UNIT TO A RECEIVER UNIT

CROSS-REFERENCE TO RELATED APPLICATION

This application claims priority to German Patent Application No. 10 2023 102 529.5 filed Feb. 2, 2023, the disclosure of which is hereby incorporated by reference in its entirety.

BACKGROUND OF THE INVENTION

Field of the Invention

The present invention relates to a method for transmitting a check vector from a transmitter unit to a receiver unit, as well as to a corresponding method for reconstructing a check vector by a receiver unit. Moreover, the present invention relates to a corresponding transmitter unit and a corresponding receiver unit which are each configured to execute the above-mentioned methods.

Check vectors can be used to detect discrepancies in distributed data bases. There are various methods for providing a check vector and for transmitting the same between a transmitter unit and a receiver unit. The method proposed by the present invention relates to check vectors based on hash values which are generated based on the entries in a database. The hash values are used to check the consistency of two data sets stored on different devices.

Description of Related Art

In a redundant distributed database, a plurality of nodes located at possibly different locations store (redundant) copies of the same information. It is one of the challenges in this field is to keep the different copies of the same information consistent. This is achieved by so-called anti-entropy mechanisms which are triggered at regular intervals or every time an inconsistency is detected.

One of the most frequently implemented anti-entropy repair protocols is based on the exchange of Merkle tree (also referred to as hash tree) between the nodes of the data base. In prior art, two different variants of this repair protocol are used. In the first variant, complete Merkle trees are exchanged via a data net in a single communication round, which leads to a large overhead, but also to a short latency time. In the second case, a multi-round protocol is used which results in a small overhead but also in a long latency time. With the present invention, it is possible to show how it is possible to rely on distributed source encoding (also known as Slepian-Wolf encoding) in order to implement a single-round protocol which has a short latency time and a small overhead. Moreover, the protocols known from prior art require the transmission of very large Merkle trees in order to precisely identify the differences between the data bases, i.e. they require the transmission of a substantial amount of overhead. The present invention proposes a method that enables a more precise detection of the differences between the data bases, while requiring less overhead.

Overview of the Existing Prior Art

In GUILLEMOT, Christine; ROUMY, Aline: Toward constructive Slepian-Wolf coding schemes. In: Distributed source coding: theory, algorithms, and applications. Amsterdam: Elsevier, 2009—ISBN 978-0-12-374485-2, various solutions to Slepian-Wolf encoding problems are described which relate to the problem of a loss-free compression of correlated sources with encoders which do not communicate.

US 2007/0 071 146 A1 describes methods for obtaining data from a plurality of distributed sources.

US 2021/0 406 116 A1 describes various approaches to performing distributed anti-entropy repair processes in a plurality of nodes in a distributed data base network.

U.S. Pat. No. 10,558,581 B1 describes a method, in which various components of a data object are distributed across a data storage system.

US 2015/0 278 030 A1 describes a method for the synchronization of a distributed data base.

US 2022/0 374 407 A1 describes a method for a multi-user partitioning in a time series data base.

A distributed data base is a data base which may seem like a single data base to a user, but is actually formed by a plurality of interconnected data bases which are stored at nodes that may be located at different locations. Distributed data bases are often redundant, i.e. they store a plurality of copies of the same information at different nodes (locations), thus achieving two advantages. The first advantage is in an improvement of the availability of the data base, since the information can be accessed even if one of the nodes is not available. The second advantage is that the load can be distributed to different nodes, which means that more users can be served.

However, it is often also a challenge to keep the data base consistent, i.e. to ensure that the multiple copies of the same entries stored on different nodes are the same. The mechanisms implemented to ensure the consistency between the different nodes are generally known as anti-entropy repair protocols [1]. The most frequently implemented protocol is based on Merkle trees [2] and is used in Amazon Dynamo [3] and Apache Cassandra [4].

For the sake of simplicity, the present invention places the focus on a so-called key-value store (also known as a key-value database). However, the invention is also applicable to any other type of data base. As such, it is assumed that each object stored in the data base is a key-value pair, i.e. two mutually associated information elements. The key is a unique identifier of the object (two objects cannot have the same key) and the value is the actual information associated to the object. As a rule, the key is short, e.g. 128 bits in length, whereas the value can be larger, but is generally not larger than a few megabytes.

A Merkle tree [5] or a hash tree is a data structure formed by a plurality of nodes. The nodes can either be leaf nodes or inner nodes. Each leaf node is identified by the (cryptographic) hash value $h(\bullet)$ of a data block, whereas inner nodes are identified by the (cryptographic) hash value of their child nodes. The number of child nodes in a Merkle tree is a parameter which can assume the value of an optional integer $c \geq 2$. In the case that $c=2$, this is referred to as a binary Merkle tree. A c-nary Merkle tree with w leaf nodes has $\log_c w$ planes of inner nodes.

For the creation of the Merkle tree, the data base D is divided into w partitions (or segments), i.e. each entry in the data base has to be assigned to one of the w partitions.

If the keys are approximately equally distributed in the data base, the key space can simply be divided into k equal partitions (or segments). If, for example, $k=2^\eta$ is assumed, where $\eta$ is an integer, the $\eta$ highest-value bits of the key can simply be used, in order to identify the data base partition assigned to an object (key-value pair). If the keys are not uniformly distributed in the key space, a hash function can be implemented to associate the keys (data base entries) to the partitions, i.e. one can rely on a hash function $f(\bullet)$ to calculate an index between 1 and k assigned to each key (data base entry) x in the data base D. If $f(\bullet)$ outputs binary character strings of a length $\kappa$, for example, where $\kappa \geq \eta$, this can be done by taking the $\eta$ highest-value bits and interpreting these as an index between 1 and $2^\eta = k$. An important aspect to be taken into account is that, for reasons of efficiency, generally also retains an auxiliary data structure allowing to keep track of which keys x are connected to each partition. This data structure can be a list of the keys x connected to the partition; however, it could also contain additional auxiliary data that allow a fast access to the keys (data base entries) in the partition x.

Thereafter, the i-th leaf node of the Merkle tree, i=1, 2, ..., w, is provided with a hash value representing all data base entries (keys) in the i-th data base partition. This can be achieved, e.g. by calculating the hash value h(x) of all keys x in the data base partition and by subsequently hashing all hash values again. Thus, if the data base partition includes the keys $\{x_1, x_2, x_3\}$, the associated leaf node of the Merkle tree can be determined as $h(h(x_1), h(x_2), h(x_3))$. Another possibility is to calculate the leaf node as an xor-value of the hash values of all entries x in the data base partition, i.e. $h(x1) \oplus h(x2) \oplus h(x3)$ in the above-described example. If a data base partition is empty, the label of the corresponding node can be declared empty, or a predefined value can be assigned, e.g. the all-zero label. Thereafter, the complete Merkle tree is constructed using the hash function $h(\bullet)$. In a binary tree, each inner node is labeled h(a, b), for example, where a and b are the labels of the two subordinate nodes.

For an illustration of how Merkle trees are used in anti-entropy repair protocols are used, reference is made to FIG. 1 which shows an example of a binary Merkle tree (i.e. inner nodes each have two child nodes) with w=8 output nodes with $\log_c(w) = \log_2(8) = 3$ levels of inner nodes. The label assigned to each node (has value) is represented in square brackets [•], while the numbers in round brackets (•) represent the data base partition (or the partition area in case of inner nodes) represented by each node. For example, the node on the outer left stands for the first data base partition and bears the label (hash) [E817 ... ], while the root node bears the label (hash value) [98AH ... ] and represents all partitions from 1 to 8, i.e. its label depends on the entries in all partitions.

It will be explained hereunder how anti-entropy repair protocols implement Merkle trees. For the sake of simplicity, it is assumed that two nodes A and B each include a copy of the data base $D_A$ and $D_B$ to be repaired, although the protocol can easily be extended to an optional number of copies. Basically, there are two different variants, i.e. a single-round protocol and a multi-round protocol. First, the single-round protocol shall be considered. Node A calculates a Merkle tree $M_A$ to represent its local copy $D_A$, and node B correspondingly calculates a Merkle tree $M_B$ to represent its local copy B. Next, node A sends its complete Merkle tree $M_A$ to host B. Host B compares both Merkle trees $M_A$ and $M_B$. This can be performed very efficiently, if it is assumed that no hash collisions exist, which is very probably the case, if a good (cryptographic) hash function $h(\bullet)$ is chosen. In particular, the trees can be processed hierarchically. First, the labels of the root nodes (level 0) of both trees are compared. If these are the same, it can be assumed that all child nodes of the root nodes are identical, i.e. it is assumed that $D_A$ and $D_B$ are identical, and the data base need not be repaired. Otherwise, it is necessary to repair $D_A$ and $D_B$, since their content is not identical. In this case, host B compares the child nodes of the root node (level 1). If the labels of a node w match in $M_A$ und $M_B$, it is assumed that the partial trees that root in w are identical, i.e. that all data base partitions represented in w are identical. Otherwise, if the labels differ, the subordinate nodes of w have to be examined to find out which data base partitions differ.

This protocol will be explained hereunder with reference to an example. It is assumed that $M_A$ is the tree illustrated in FIG. 1, whereas FIG. 2 illustrates $M_B$. In the latter Figure, the nodes that differ between the two trees are marked in bold. In this example, the root nodes are compared first. Since they differ, the nodes on level 1 are then compared next. The left child nodes of $M_A$ and $M_B$, (1-4) are different, but the right child nodes representing the partitions (5-8) are identical. From this, it is concluded that some differences exist in partitions 1 to 4, but no differences exist in partitions 5 to 8. Next, the subordinate nodes of (1-4) are compared. The nodes representing partitions (1-2) are identical, which allows to conclude that partitions 1 and 2 are identical in both data bases. The nodes representing partitions (3-4), however, differ, so that their child nodes have to be compared. Finally, the child nodes (3) and (4) are compared and the result is that partition 3 differs between $D_A$ and $D_B$, but partition 4 does not. With the differences between the two data bases now being narrowed down, the two copies of the data bases can be repaired. Here, it should be noted that the partitions in which the differences exist may now be known, but that it is still unknown which keys are inconsistent. In the foregoing example, it could be determined that all keys in partition 3 are potentially inconsistent. However, a large number of keys could exist in this partition, and the actual number of inconsistent keys could be low (e.g. only one key). Generally, this is achieved, for example, by exchanging the different data base partitions, although it is also possible to use another algorithm to synchronize the two data base partitions. As such, for example, all objects (key-value pairs) in a partition can be imagined as a smaller data base and implement an algorithm to match the two small data bases (e.g. again based on Merkle trees or by implementing an algorithm for quantity comparison). Thus, Merkle trees are used in the anti-entropy repair protocol to determine which data base partitions have to be repaired.

The multi-round protocol is very similar to the single-round protocol. The difference is that not the complete tree is exchanged, but initially only the root node (level 0). If the root nodes are identical, the two copies of the data base are identical and there is no need for the exchange of further information. Otherwise, the nodes on level 1 are exchanged. The nodes of level 1 are now compared. If a node y is identical in both trees, none of the child nodes of this node has to be exchanged. However, if a node differs, its child nodes have to be exchanged. In the above example, the root node would be exchanged first. Since the root nodes differ, their child nodes (1-4) and (5-8) would be exchanged. Next, nodes (1-2) and (3-4) would be exchanged, but not (5-6) and (7-8), since their superior node (also referred to as parent node in English) is identical in both trees. Thus, the multi-round protocol can reduce the overhead, i.e. the number of nodes to be exchanged. This increase in efficiency is achieved, however, at the cost of additional communication rounds which come with a longer latency time. This can be a problem, especially, if the delay between the different nodes is great. As can easily be seen, the number of protocol rounds depends on the depth of the Merkle tree. The Merkle trees used in practice for data base synchronization have a depth of about 16 levels, which means that the multi-round protocol requires 16 rounds to determine the differences between the data bases.

Regarding the size of the tree to be used in the repair protocol, it should be noted that a compromise exists between the quantity of the metadata exchanged and the accuracy with which differences are detected. If the data base partitions are to be kept very small, one could ideally operate in a system in which each partition includes only one data base entry. This would make the repair protocol very accurate, since it would be able to precisely 'detect which entries differ between $D_A$ and $D_B$. However, this would also mean that a great quantity of metadata (a large Merkle tree) has to be exchanged. However, if the data base partitions are large, only few metadata are transmitted, i.e. the size of the Merkle tree is small. However, the repair protocol becomes inaccurate, since the data base partitions now contain a great number of entries. It should be noted that every time a data base partition differs in only one entry between $D_A$ und $D_B$, the entire data base partition has to be exchanged.

Slepian-Wolf or Distributed Source Encoding

Distributed source encoding is a general framework in information theory, which deals with the compression of a plurality of correlated information sources. The present invention will deal with a special variant of distributed source encoding. In particular, consideration shall be given to a structure with two correlated information sequences $x_1$, $x_2$, ... and $y_1$, $y_2$, ..., each sequence being connected to realizations of two random variables X and Y. For the sake of simplicity, it is assumed that both random variables X and Y take values from a finite body with $2^\ell$ elements, $F_2^\ell$. Therefore, $x_i$ and $y_i$ can be considered arrays von $\ell$ bits. However, this does not necessarily have to be the case, since X and Y can basically assume values in any alphabet. The dependence between X and Y is characterized by the conditional probability distribution $P_{X|Y}(x|y)$.

In this system, there are two communicating units, the encoder and the decoder. The encoder can only monitor the random variable X, while the decoder can only monitor the random variable Y. The objective is that the encoder transmits a series of n realizations of X, $x=(x_1, x_2, \ldots, x_n)$ to the decoder and, in doing so, transmits as little information (measured in bits) as possible. The core of the problem is that the encoder has to compress x without having access to $y=(y_1, y_2, \ldots, y_n)$, and the decoder has to decompress without having access to x as illustrated in FIG. 3.

It has been shown in [6] that a loss-free (or perfect) compression is possible at $R \geq H(X|Y)$, where $H(X|Y)$ refers to the conditional entropy of X with Y given, i.e. the entropy of the conditional distribution of the random variable X in the random variable Y, $X|Y$. In general, this limit value can be approximated, if n, the sequence length, increases to infinity, whereas in case of a small n, the compression obtained generally decreases.

In practice, the distributed source encoding can be implemented using error correction codes (or channel codes). Actually, a large number of distributed source encoding methods has been proposed, which are based on different channel codes.

A common choice is the so-called "syndrome approach" which is generally based on Low Density Parity Check Codes (LDPC) [7]. Since presently non-binary random variables are considered, it is better to also explain this approach with reference to a non-binary channel code. In particular, the use of a (n, k) channel code C shall be considered which is built over $F_2^\ell$ with a parity check matrix H. The encoder compresses x by calculating the syndrome $s = Hx^T$, where $(\bullet)^T$ is the transposition. The syndrome s having the length n–k and whose elements also take values in $F_2^\ell$ is sent to a decoder. The decoder then implements a syndrome-based decoder. In particular, the decoder may first calculate $s' = Hy^T$. It then calculates:

$$s'' = s + s' = Hx^T + Hy^T = H(x^T + y^T) = He^T$$

The decoder then tries to determine the "best possible" error vector e that is subject to the condition $He^T = s''$. For example, the decoder can try to calculate the most probable error vector e which results in a syndrome s''

$$\tilde{e} = \arg\max_e P(e|s'')$$

Finding the exact solution to this problem is generally a difficult task. Instead, the decoder can try to calculate the following:

$$\hat{e} = \bigcup_{i=1}^{n} \arg\max_{e_i} P(e_i | s'')$$

under the condition $H\tilde{e}^T = s''$. This can be achieved by means of a "syndrome-based iterative (or message passing) decoder" [7].

Another possibility is the so-called "parity approach", see e.g. [10], which used turbo codes. This approach is based on a (n, k) systematic error correction code. In this approach, the distributed source encoder uses x as an input for the channel encoder.

After application of a suitable permutation, the output can be written as c=(x, p), where p is an n–k vector referred to as parity. The distributed source encoder then sends only the parity symbols to the decoder, i.e. the vector p. The decoder then forms a vector ĉ=(y, p) which is then transmitted to the channel encoder as an input. It should be noted that the two parts of ĉ have different reliabilities. While y is interpreted as a noisy version of x, the parity p is a perfect (noise-free) observation. Finally, the channel decoder yields an estimate for x, x̃, at its output. The parity approach can also be modified in order to use a systematic rateless code, i.e. an LT- or Raptor Code, see [11] and [12]. This means that additional parity bits can be generated and sent to the decoder if necessary, if the same is unable to decode data in a similar manner as in the rate-compatible parity approach.

Besides the approaches, the syndrome-based and the parity-based approach, other related approaches exist. For example, [13] used a general approach that allows to basically use any channel code, while [14] presented an approach based on the channel polarization.

Disadvantages of Related Art

The interesting area (in which practical systems operate) is the area in which the data bases are large (e.g. millions of entries) and the number of differences between the data base copies is small relative to the size of the data base (at most 1 out of 1000 data base entries, often even less). In this case, anti-entropy protocols based on Merkle trees have to operate with a large number of data base segments (large Merkle tree) to exactly identify the differences between the different data base copies.

This has two disadvantages. The first disadvantage lies in that the existing anti-entropy protocols cannot be optimal with respect to bandwidth and delay at the same time. The transmission of the complete Merkle tree, as is performed in the single-round protocol, means substantial overhead. Instead, the multi-round protocol can be used which allows a substantial reduction in overhead, however, at the cost of an increased latency time, since the protocol runs for several rounds. The second disadvantage is that the protocols known from prior art are not accurate (in the sense of an accurate identification of the data base entries that have to be repaired), without increasing the size of the Merkle tree to an extent that it becomes impractical because of the large overhead.

These problems are acerbated, if the size of the data bases increases or if a large number of data base copies (nodes) has to be repaired.

SUMMARY OF THE INVENTION

It is an object of the present invention to overcome the above described disadvantages of prior art. To achieve this object, the present invention proposes a method for transmitting a check vector from a transmitter unit to a receiver unit, the check vector being provided for checking the consistency of a data set, and the method comprises the following steps:

dividing a data set into a plurality of sections;
calculating a hash value for each of the sections, using a hash function;
combining the check vector from the calculated hash values
compressing the check vector, the compression being performed using a Slepian-Wolf encoding method; and
transmitting the compressed check vector from the transmitter unit to the receiver unit.

The present invention enables a particularly efficient detection of discrepancies within a data base, since the check vector is transmitted in a particularly efficient manner. In the method according to the invention, the check vector is compressed particularly efficiently and is transmitted to the receiver unit in a compressed form. In this manner, the required bandwidth is significantly reduced.

For calculating the hash values, one may revert to a hash function known from prior art. For example, the SHA-256 algorithm or a related algorithm can be implemented.

After calculation of the has values, the check value is assembled from the determined hash values. Combining the check value can be performed, for example, by stringing together the individual hash values. Thereafter, the check vector is compressed using a Slepian-Wolf encoding method and is transmitted to the receiver unit in a compressed form. The receiver unit can subsequently reconstruct the data set of the transmitter unit by means of the compressed check vector.

According to the present invention, it may be provided that the compression of the check vector is performed using a distributed source code at a fixed information rate, and in particular using a convolutional code, a turbo code, a Low Density Parity Check Code, or a polar code.

It may also be provided that
the compression of the check vector is performed using a Low Density Parity Check Code, LDPC;
the compression of the check vector comprises the calculation of a syndrome according to $s = Hu^T$, where H is the control matrix, u describes the check vector, and $(\bullet)T$ is the transposed matrix; and
wherein the syndrome s is transmitted from the transmitter unit to the receiver unit.

According to some embodiments of the method of the present invention, it may be provided that the compression of the check vector is performed using a rate-compatible source code.

Moreover, it may be provided in the method according to the present invention that the compression of the check vector is performed using a Low Density Parity Check Code, wherein, first, a first syndrome s is transmitted from the transmitting unit to the receiver unit, and the transmitter unit transmits additional syndrome bits to the receiver unit, if the receiver unit is unable to reconstruct the data base of the transmitter unit using the received syndrome bits. Analogously, it may be provided that a request message is transmitted from the receiver unit to the transmitter unit, wherein the request message transmitted from the receiver unit to the transmitter unit may be configured to trigger transmission of the additional syndrome bits from the transmitter unit to the receiver unit.

It may additionally be provided that the transmission of additional syndrome bits from the transmitter unit to the receiver unit is repeated until the receiver unit is able to reconstruct the data base of the transmitter unit.

In addition, it may be provided in the method according to the invention that the encoding is based on an information-rateless encoding, and that the transmitter unit continuously sends redundancy information to the receiver unit, and does so preferably until the receiver unit is able to reconstruct the data base of the transmitter unit.

Moreover, it may be optionally provided that the transmitter unit repeatedly sends parity information to the receiver unit, until the receiver unit is able to reconstruct the data base of the transmitter unit.

To achieve the above-mentioned object, a method is proposed for reconstructing a check vector by a receiver unit, from a transmitter unit to a receiver unit, the check vector being provided for checking the consistency of a data set, and the method comprises the following steps:

receiving, by a receiver unit, a compressed check vector sent by a transmitter unit, the compressed check vector being compressed based on a Slepian-Wolf encoding method; and
decompressing the compressed check vector by the receiver unit using a Slepian-Wolf decoding method.

Here, it may be provided that the decompression of the compressed check vector is performed using a Low Density Parity Check Code decoding method.

In addition, it may be provided that the decompression of the compressed check vector is performed based on a syndrome decoding method and with the use of side information.

In addition, the present invention proposes a method for transmitting a check data set from a transmitter unit to a receiver unit, the check data set being provided for checking the consistency of a data set, and the method comprises the following steps:

dividing the data set into a plurality of sections; the data set being divided along a plurality of dimensions;
calculating a hash value for each of the sections, using a hash function;
combining the check data set from the calculated hash values; and
transmitting the compressed check data set from the transmitter unit to the receiver unit.

In this case, the check data set can be assembled, for example, by stringing together the calculated hash values. In this manner, a check vector can be generated. As an alternative, also other check data sets can be generated, which are based on a Merkle tree data structure (also referred to a hash tree), as will be explained in the following.

According to some embodiments, it can be provided that combining the check data set includes building a Merkle tree data structure, the calculated hash values representing the leaf nodes of the Merkle tree data structure. Here, the check data set can either comprise the entire Merkle tree data structure or only a part of the Merkle tree data structure. For example, the check data set can include a complete Merkle tree which is selectively transmitted from the transmitter unit to the receiver unit in a single round (also referred to as single-round approach in English), or is transmitted to the receiver unit in several steps (also referred to as multi-round approach in English).

It can also be provided that combining the check data set comprises the generation of a plurality of Merkle tree data structures, where one Merkle tree data structure is generated for each dimension. Here, each Merkle tree data structure can be transmitted individually to the receiver unit. As an alternative, a multi-stage transmission method (multi-round approach) can be chosen for the transmission of the Merkle tree data structure.

It can also be provided that the check data set is first compressed and is then transmitted to the receiver unit in a compressed form. The check data set can preferably be compressed using a Slepian-Wolf encoding method.

Moreover, to solve the above-mentioned object, a transmitter unit comprising a processor unit, a memory unit and a communication unit, is proposed, the transmitter unit being configured to
- divide a data set into a plurality of sections;
- calculate a hash value for each of the sections, using a hash function;
- assemble a check vector from the calculated hash values;
- compress the check vector using a Slepian-Wolf decoding method; and
- transmit the compressed check vector to a receiver unit.

The transmitter unit can further be configured to execute the method steps described above in the context of the transmitter unit.

Moreover, to solve the above-mentioned object, a receiver unit comprising a processor unit, a memory unit and a communication unit, is proposed, the receiver unit being configured to
- receive a compressed check vector sent by a transmitter unit, the compressed check vector being compressed based on a Slepian-Wolf encoding method; and
- decompress the compressed check vector using a Slepian-Wolf decoding method.

The transmitter unit can further be configured to execute the method steps described above in the context of the transmitter unit.

Moreover, the present invention proposes a transmitter unit comprising a processor unit, a memory unit and a communication unit, is proposed, the transmitter unit being configured to
- divide a data set into a plurality of sections, the data set being divided along a plurality of dimensions;
- calculate a hash value for each of the sections, using a hash function;
- assemble a check data set from the calculated hash values; and
- to transmit the check data set from the transmitter unit to the receiver unit.

Finally, the present invention proposes a receiver unit comprising a processor unit, a memory unit and a communication unit, the receiver unit being configured to execute the method steps described above in the context of the receiver unit.

BRIEF DESCRIPTION OF THE DRAWINGS

In FIG. 2, those nodes whose labels differ from those in FIG. 1 are highlighted in bold.

Furthermore.

DESCRIPTION OF THE INVENTION

Figure 1:
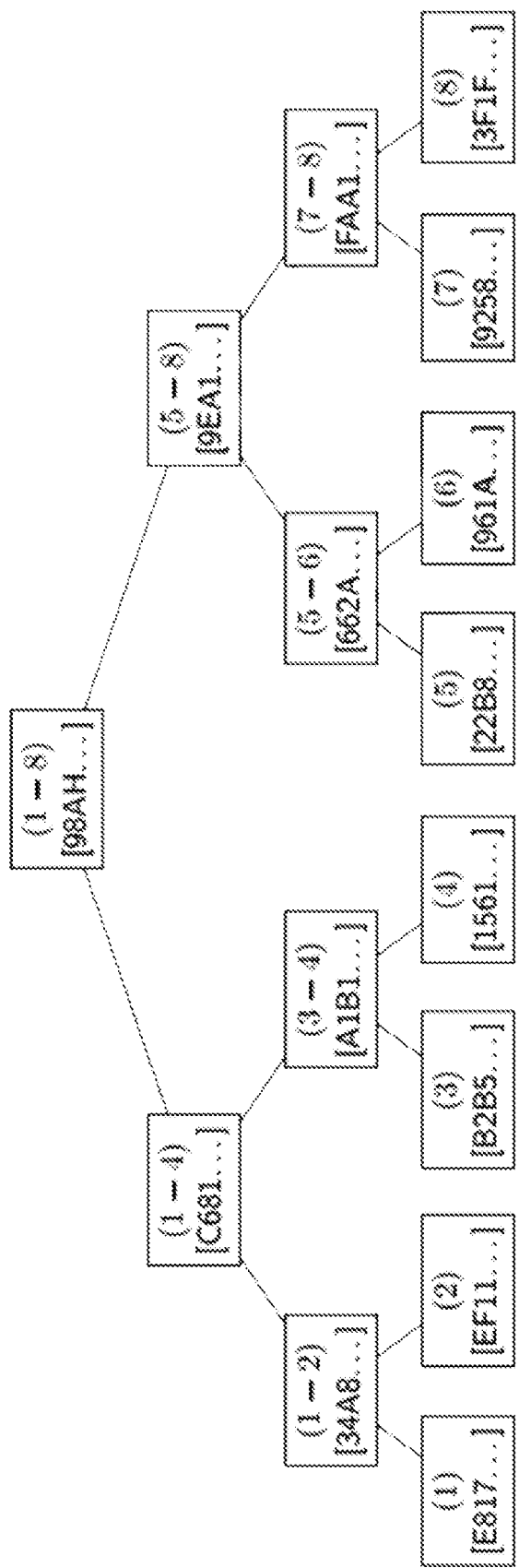
FIG. 1 shows an example for a first binary Merkle tree with n=8 leaf nodes ($M_A$) to illustrate a first data set $D_A$ and FIG. 2 shows an example for a second binary Merkle tree with n=8 leaf nodes ($M_B$) to illustrate a second data set $D_B$.
Figure 2:
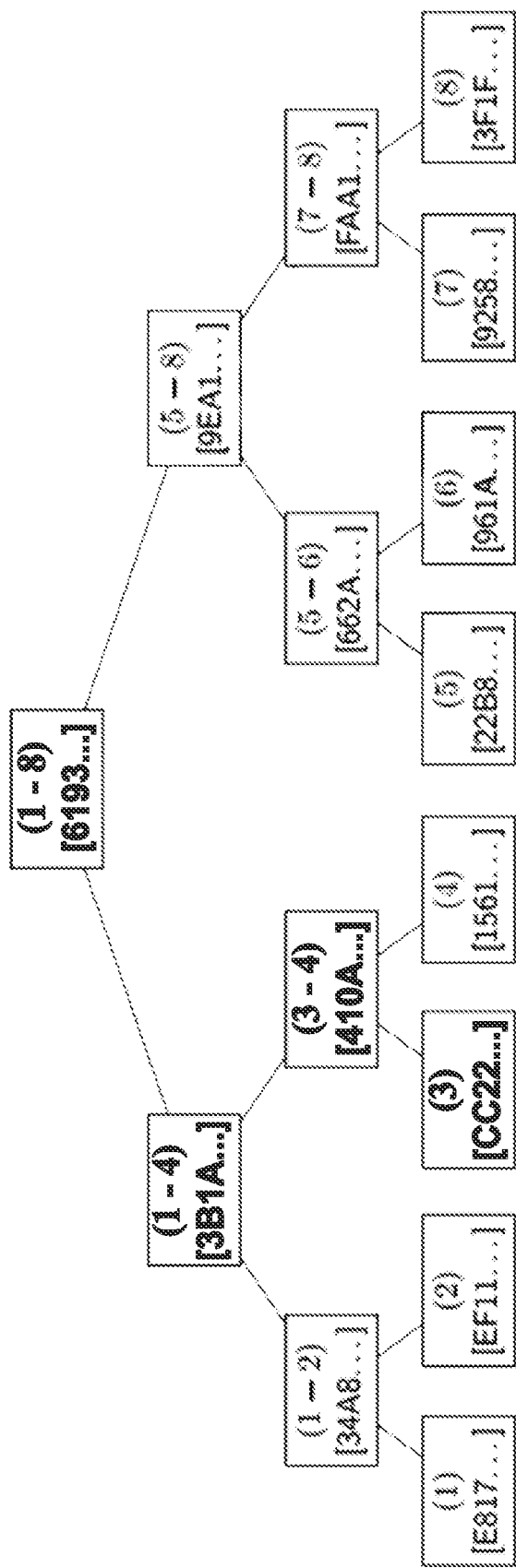
Figure 3:
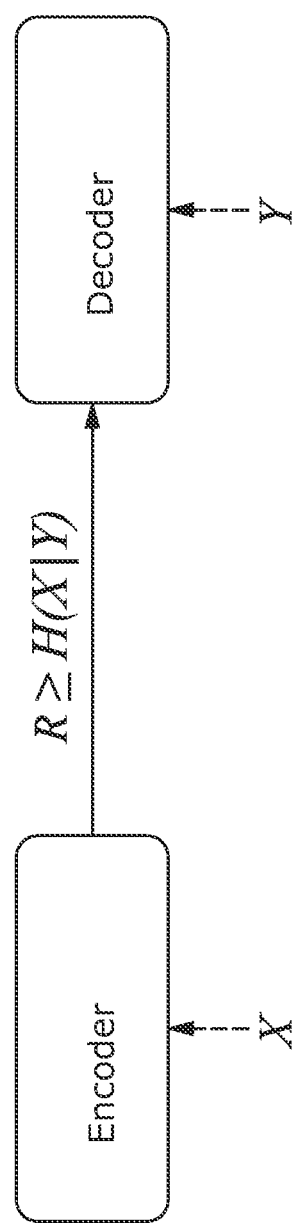
FIG. 3 shows the structure of the distributed source encoding. The encoder considers the random variable X and the decoder monitors the random variable Y. The encoder compresses its message, while only having access to X, whereas the decoder performs the decompression, while only having access to Y and the (decompressed) message received from the encoder. A perfect (loss-free) compression is possible at a rate R which is equal to or higher than H(X|Y).
Figure 4:
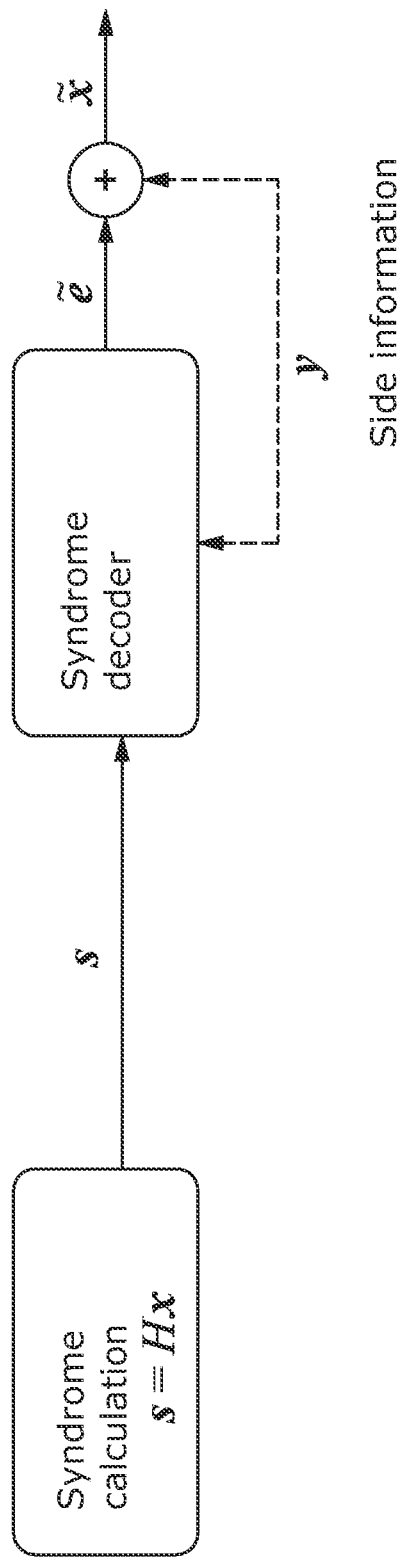
FIG. 4 schematically shows the syndrome approach for the distributed source encoding.
Figure 5:
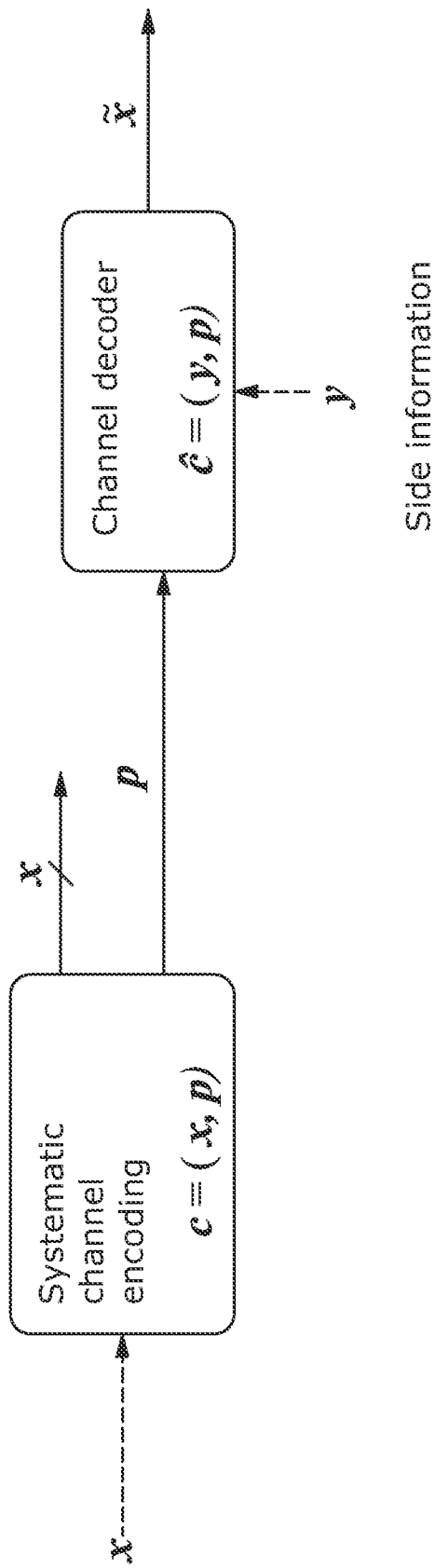
FIG. 5 shows the parity approach for the distributed source encoding.

Compared to prior art, the present invention offers two improvements which enable a precise design of the anti-entropy protocol with a small overhead, wherein a plurality of communication rounds is not ultimately necessary. The first improvement is the use of the Slepian-Wolf encoding in order to minimize the required overhead, and requires only a single communication round. The second improvement is based on the so-called multi-dimensional partitioning of the data base for increasing the accuracy of the method. In the method according to the invention, both improvements can be implemented wither individually or in combination.

First Embodiment Anti-Entropy Based on
Slepian-Wolf Encoding

This solution is based on a distributed source (also known as Slepian-Wolf) to minimize the overhead, without necessarily requiring a plurality of communication rounds.

Again, the case will be considered, in which a plurality of copies of a data base D exists which have to be repaired, so that all copies are identical. For the sake of simplicity, also the case shall be considered, in which only two copies are stored at the nodes A and B, although the invention can, of course, also be implemented if more than two copies of the data base exist.

The first step is to divide the data base or the data set stored in the data base into k partitions. In particular, node A can divide its data base copy $D_A$ into k partitions, while B performs the same on its data base copy $D_B$. If the keys are distributed approximately uniformly in the data base, the data base can (as already mentioned above) simply be divided into $k=2^\eta$ partitions by relying on the $\eta$ highest-value bits of the key x to assign a partition thereto. As an alternative, a hash function $f(\bullet)$ can be used, as already explained.

After the data base has been divided into partitions, each of the nodes calculates the hash value of each data base partition with the help of a hash function $f(\bullet)$, whose output is $\ell$ bits in length. In the following, $u_i$ and $v_i$ denote the has values of the i-th data base partition of the nodes A or B, which will also be referred to as labels in the following. Furthermore, $u=(u_1, u_2, \ldots, u_k)$ and $v=(v_1, v_2, \ldots, v_k)$ denote the label vectors of the length k of the nodes A or B.

Assuming that no hash collisions exist, u and v can be used to determine, whether the two data base copies are identical or not. In particular if $u_i=v_i$, it can be assumed that the i-th data base partition is consistent (identical) in both copies. If, however, if $u_i \neq vi$, the i-th data base partition is inconsistent (not identical) and thus has to be repaired.

A simple approach would be that node A simply transmits u to node B. However, this is inefficient (with large data bases, u can be very large).

In particular, it can be noted that, if the number of differences between $D_A$ und $D_B$ is small, it can be expected that the vectors u and v are similar, so that the distributed source encoding (also known as Slepian-Wolf encoding) can be implemented to efficiently transmit u to node B.

Hereinafter, three different cases will be considered in dependence on the assumptions about the similarity between u and v.

Case 1

This case is relevant if host A has a good estimate on how many components differ between u and v. In particular, this first scheme is the preferred scheme if A knows that both filters differ in at most t of a total of k positions. Therefore, host A relies on a distributed source encoding scheme with a fixed rate, which can be obtained with a code with a fixed rate, e.g. a convolutional code, a turbo code, an LDPC code or a polar code.

Basically, any distributed source encoding scheme can be implemented, including the schemes described above as syndrome- and parity-based, or the general scheme in [13]. The present invention shall be illustrated hereunder with reference to a syndrome-based scheme which is based on a LDPC code. In view of the nature of the problem, the simplest solution is to rely on a (non-binary) (n, k) code C over $F_{2^\ell}$. The encoder (node A) compresses u by calculating the syndrome $s=Hu^T$, where $(\bullet)^T$ is the transposition. The syndrome s having a length of n–k bits is sent to the decoder (host B). The decoder then uses syndrome decoding, whose output is the estimated error vector $\hat{e}=(e_1, e_2, \ldots, e_k)$. If syndrome decoding is successful, node B can reconstruct u as $u=v+\hat{e}$. However, in the present case, this is not necessary, since the anti-entropy protocol is rather about determining which partitions are to be repaired. Instead, the node B can simply inspect $\hat{e}$ to determine which data base partitions are inconsistent and have to be repaired. If $e_i=0$, this means that the i-the partition is consistent in both data bases and need not be repaired. Otherwise, if $e_i \neq 0$, the i-th partition is inconsistent and has to be repaired. As already mentioned, the inconsistent partitions can be repaired in different ways. One possibility is to simply exchange the entire data base partitions, but other algorithms can also be implemented for reconstruction.

Presently, it was assumed that the code C was generated over $F_{2^\ell}$, since this option is the most evident and offers the best performance. However, it is also possible to implement a binary code or a code on another finite body, although in this case, the performance would not be as good (this should be obvious to a person skilled in the field of channel encoding).

Case 2

This case is relevant, if A knows that u and v differ in approximately d positions. As an alternative, if A has an approximate knowledge of the number of differences in the data base, it can easily estimate in how many positions u and v differ. In this case, A proceeds in a manner similar to case 1, but relies on a rate-compatible code.

That means that host A first calculates and transmits a syndrome s which is probably long enough to allow host B the reconstruction of ê. If host B is unable to decode, i.e. to reconstruct $BF_A$, host A can send additional syndrome bits. These additional syndrome bits can be combined with the first syndrome transmitted, and host B can again attempt decoding. If necessary, this process can be repeated many times, see [9].

Case 3

This case is relevant, for example, if host A is unsure about the magnitude of the conditional entropy between u and v, i.e. it does not know how similar $D_A$ and $D_B$ are. In this case, the method is based on a rateless distributed encoding method. As such, host A continuously transmits redundancy to host B. Host B attempts to continuously decode, and if it is successful, it reports to host A which then cancels transmission of the redundancy. Here, one may rely on the methods introduced in [11] and [12]. These methods can basically generate an infinite number of parity symbols.

Second Solution: Multi-Dimensional Division

The second solution is to partition or divide the data base along several dimensions. In the following, d is the number of dimensions and k is the number of partitions into which the data base is divided across the i-th dimension. In this manner, the data base is divided into a total of $\Pi_{i=1}^{d} k_i$ partitions.

In standard Merkle tree-based anti-entropy protocols, each key x is connected to a data base partition (or partition). In the solution proposed by the present invention, each data base entry or key x is linked to d partitions, namely one partition in each of the d dimensions. The partition vector of a particular key x is denoted as $s=(s_1, s_2, \ldots, s_d)$, where $s_i$ is the partition that x is assigned to in the i-th dimension, $s_i$ being a natural number between 1 and $k_i$. If the dependence of the key x is to be made explicit, its partition vector is denoted as $s^{\{x\}}=(s_1^{\{x\}}, s_2^{\{x\}}, s_d^{\{x\}})$. For assigning a partition vector to a key x, one may rely on d different hash functions $f_1(\bullet), f_2(\bullet), \ldots, f_d(\bullet)$, where $f_i(\bullet)$ is used to calculate $s_i$ which can be considered an index between 1 und $k_i$. If $k_i=2^{\eta_i}$, this can be achieved for example by interpreting the $\eta_i$ bits of $f_i(x)$ with the highest (or lowest) significance as a number between 1 und $k_i$. If the keys are approximately uniformly distributed across the key space, the index could be obtained over a certain dimension i directly as the $\eta_i$ highest-value bits of the key x (or the lowest-value bits, or by taking optional $\eta_i$ bits of the keys).

The next step is the calculation of a label for each of the partitions over the different dimensions. This is done in the same manner as with Merkle tree-based anti-entropy protocols, but over different dimensions. Let $u_{i,j}$ and $v_{i,j}$ denote the labels calculated by A and B in order to represent all keys x (data base entries) assigned to the partition j over the i-th dimension, i.e. all keys x for which $s_i=j$. This can be achieved, for example, by calculating the hash value h(x) of all keys x in the partition and by subsequently again hashing all hash values. Thus, if the partition includes 3 keys $\{x_1, x_2, x_3\}$, the associated leaf node of the Merkle tree can be determined as $h(h(x_1), h(x_2), h(x_3))$. Another possibility is to calculate the label as an xor (bit-wise modulo-2-sum) of the hash values of all entries x in the data base partition, i.e. $h(x1) \oplus h(x2) \oplus h(x3)$ in the above-described example. Other options are possible in this case as well. At the end of this process, a total of $k_{total}=\Sigma_i k_i$ labels are calculated. In the following, u and v shall denote the vectors of the labels of A and B:

$$u=(u_{1,1}, \ldots u_{1,k1}, u_{2,1}, \ldots u_{2,k2}, \ldots, u_{d,1}, \ldots u_{d,kd})$$

$$v=(v_{1,1}, \ldots v_{1,k1}, v_{2,1}, \ldots v_{2,k2}, \ldots, v_{d,1}, \ldots v_{d,kd})$$

After all labels are calculated, node A has to transmit the vector u to node B, and node B has to compare u and v to determine which labels are the same and which are different. This can be done in different ways:

1. A first possibility would be the simple transmission of u to B, which requires the transmission of $k_{total}$ labels.
2. A second possibility would be the construction of a Merkle tree, in which the $k_{total}$ labels are placed in the leaf nodes of a Merkle tree. Thereafter, either the entire Merkle tree can be transmitted in a single round, or one may rely on a multi-round protocol which, starting with the root, avoids transmission of partial trees with matching labels (as is the case in prior art). At the end of this process, B has determined the positions at which u and v differ.
3. A third possibility is to rely on a plurality of Merkle trees. For example, one Merkle tree could be constructed over each of the d dimensions. This means that the $k_{total}$ labels of the i-th dimension are used as leaf nodes to calculate a Merkle tree for the i-th dimension.
   Thereafter, each of the d Merkle trees could be transmitted either in a single round or within the framework of the above-described multi-round protocol.
4. Another possibility is Slepian-Wolf encoding (as described in this invention) in order to transmit the vector of $k_{total}$ labels to B.

At the end of this process, B has determined the positions at which u and v differ. Let e denote the error vector of a length $k_{total}$, which indicates at which positions u and v differ:

$$e=(e_{1,1}, \ldots e_{1,k1}, e_{2,1}, \ldots e_{2,k2}, \ldots, e_{d,1}, \ldots e_{d,kd})$$

where $e_{i,j}$ assumes the value 0, if $u_{i,j}=v_{i,j}$ and otherwise assumes the value 1.

In the next step, B has to determine which keys (data base entries) x of $D_B$ are potentially inconsistent (and thus have to be repaired). In particular, all keys x having the partition vector $s^{\{x\}}=(s_1, s_2, \ldots, s_d)$ are potentially inconsistent, if $\Sigma_i^d e_{i,s_i}=d$, i.e. if all elements in its partition vector $s^{\{x\}}$ belong to partitions that are defective. After the quantity of potentially inconsistent keys has been determined, these have to be repaired. This can be achieved by directly exchanging all potentially inconsistent keys. Similar to the Merkle tree-based anti-entropy protocols, it is possible to treat the quantity of the potentially inconsistent keys as (small) data bases and to implement another algorithm for comparison of the data base (e.g. the Merkle tree-based anti-entropy protocol according to prior art, the protocols described in the present application or any other protocol).

The advantage of the multi-dimensional partitioning is that the number of calculated labels is the sum of the number of partitions across each of the d dimensions, $k_{total}=\Sigma_{i=1}^{d} k_i$, whereas the number of the different partition vectors is much larger, since it is the product $\Pi_{i=1}^{d} k_i$. By transmitting the same quantity of metadata (labels, Merkle tree or Slepian-Wolf encoded labels), the anti-entropy protocol can be made much more accurate.

This comes at the cost of a slight increase in the complexity of the search for potentially inconsistent keys. Here, different options are possible in order to obtain the potentially inconsistent keys.

A first possibility is to browse through all elements of the data base, to calculate their partition vector and to check, whether they are potentially inconsistent. This would mean that all keys x have to be searched in order to obtain their segment vector $s^{\{x\}}=(s_1^{\{x\}}, s_2^{\{x\}}, \ldots, s_d^{\{x\}})$ and to check, whether $\Sigma_i^d e_{i,s_i^{\{x\}}}=d$. This approach could be preferred for small data bases, but is otherwise rather inefficient.

A second possibility is to keep an auxiliary data structure for each of the $k_i$ partitions about the different dimensions. This data structure could, for example, be a list of the keys x that are connected tom the partition j in the i-th dimension, i.e. all keys x for which $s_i^{\{x\}}=j$. With this option, $k_{total}=\Sigma_{i=1}^{d} k_i$ different data structures would have to be retained. The data structures can be used to obtain the quantity of keys x which are potentially inconsistent in the i-th dimension and which are denoted as $\varepsilon_i$. This quantity includes all keys x for which $e_{i,s_i^{\{x\}}}=1$. Thus, to obtain the potentially inconsistent keys, one would have to search for those x that are potentially inconsistent across all d dimensions, formally $\cap_{i=1}^{d} \varepsilon_i$ (the intersection of the different $\varepsilon_i$).

A third option could be to keep an auxiliary data structure (e.g. a list) for each possible segment vector. This would mean that $\Pi_{i=1}^{d} k_i$ different data structures are obtained, with each data structure being linked to anther segment vector. This means that such a data structure would allow to obtain all keys x with $s^{\{x\}}=(h_1, h_2, \ldots, h_d)$.

Advantageous Characteristics of the Present Invention

The present invention can be implemented in a redundant distributed data base, in which two or more copies of data are stored on different nodes, as well as in other applications for matching data quantities. In this regard, the invention comprises two solution approaches:

- The main characteristic of the first approach is the use of Slepian-Wolf encoding techniques in order to determine which data base partitions have to be repaired.
- The main characteristic of the second approach is based on the fact that the data base is partitioned across different dimensions.

Both approaches do not exclude each other and can be combined with each other.

First Solution Approach: Anti-Entropy Based on Slepian-Wolf Encoding

Figure 6:
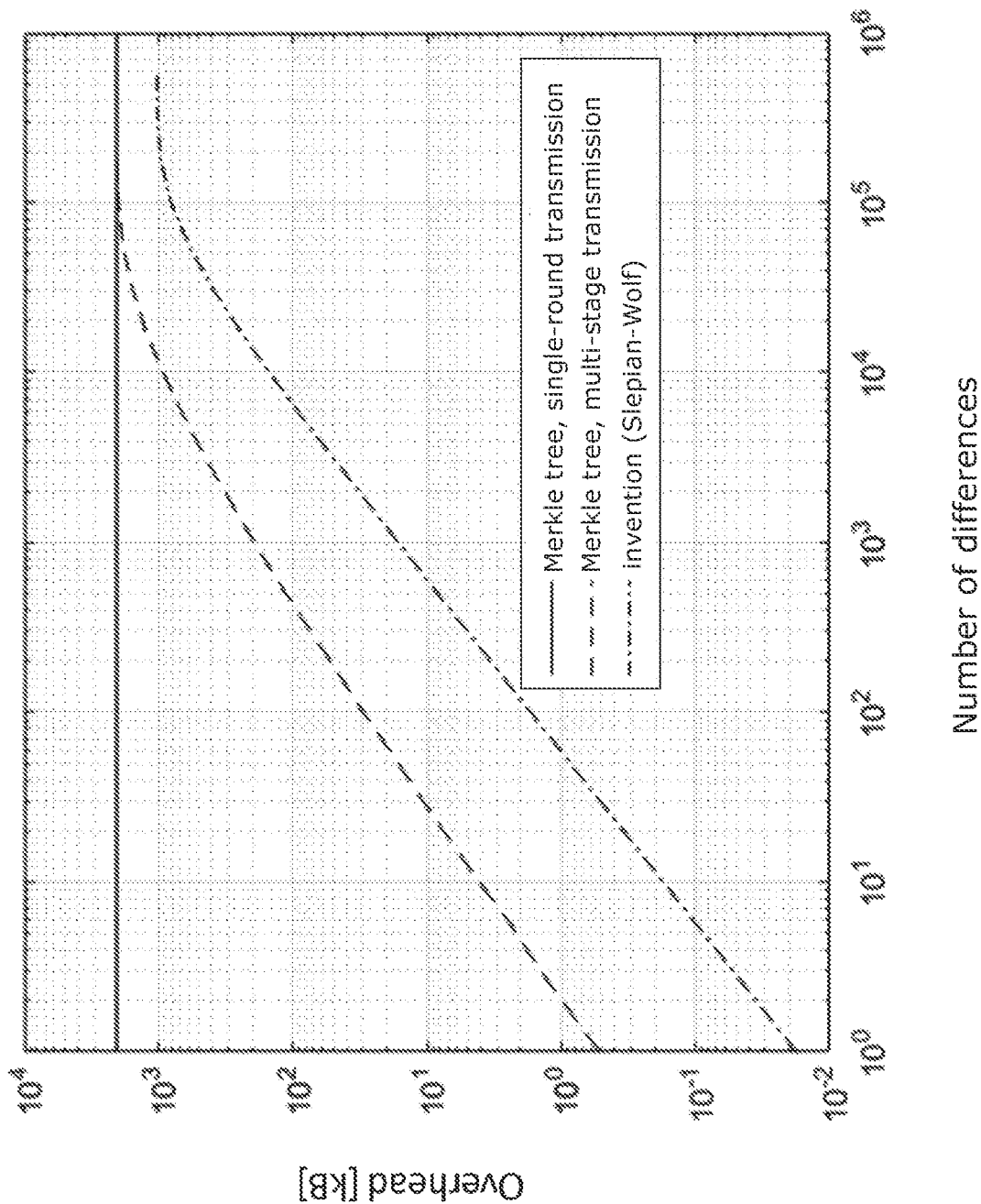
FIG. 6 shows the overhead linked to the anti-entropy protocol in dependence on the number of differences between $D_A$ und $D_B$, assuming a data base size with $10^6$ entries. The Merkle trees used are binary and comprise $2^{16}$ leaves.

FIG. 6 illustrates the overhead linked to different anti-entropy protocols. In particular, the single- and multi-round anti-entropy (also known as single-round or multi-stage transmission) will be considered, which relies on a binary Merkle tree (c=2) with $2^{16}$ leaves, and the scheme proposed in the present invention which relies on the Slepian-Wolf encoding, in which also $2^{16}$ data base segments are used. In this case, a data base with $10^6$ entries is assumed, the number of differences being between 1 and $10^6$ (the entire data base). The output of the hash function is assumed to be 128 bits. As can be seen in FIG. 6, the overhead of the single-round Merkle tree-protocol (single-round protocol) is constant (2 MB). In contrast thereto, the overhead of the multi-round Merkle tree protocol (multi-round protocol) is very small if the number of differences is small, but it increases with the number of differences. The Slepian-Wolf method proposed by the present invention transmits less overhead than the Merkle tree methods. Further, in contrast to the multi-round Merkle tree protocol that requires 17 rounds, it requires only a single round. Note: For the method described in the present invention, it was assumed that the number of differences is known and that a capacity-increasing channel code is used.

Second Solution Approach: Multi-Dimensional Partitioning

A situation will now be considered, in which two nodes A and B have two different versions of the same data base. In particular, it is assumed that the data bases of A and B, $D_A$ und $D_B$, include a total of $10^6$ entries, the number of the differences between $D_A$ und $D_B$ being between 1 and $10^6$.

Three different anti-entropy approaches shall be compared that differ in the way the data base is partitioned. The first method corresponds to prior art, in which the data base is divided into $2^{16}$ partitions, as explained above in the context of the Merkle tree-base anti-entropy protocols. In the second method, the data base is divided into two dimensions with $2^{15}$ partitions across each dimension. The third method divides the data base into four dimensions and $2^{14}$ partitions per dimension. Both the second and the third method follow the partitioning method proposed by the present invention.

The different systems are compared with regard to their inaccuracy, the inaccuracy being defined as the ratio of the keys (data base entries) that were identified as potentially inconsistent and the actual number of inconsistent (different) keys. Thus, the best possible inaccuracy is 1, since in this case only the potentially inconsistent keys match with the actually inconsistent ones. The greater the inaccuracy, the higher the number of keys that are identified as potentially inconsistent, but are actually consistent. In an exemplary implementation, one could revert to directly exchange all potentially inconsistent keys. Thus, the inaccuracy is a measure for the number of data that have to be exchanged in the second phase of the anti-entropy protocol, as soon as the differences have been narrowed down.

Figure 7:
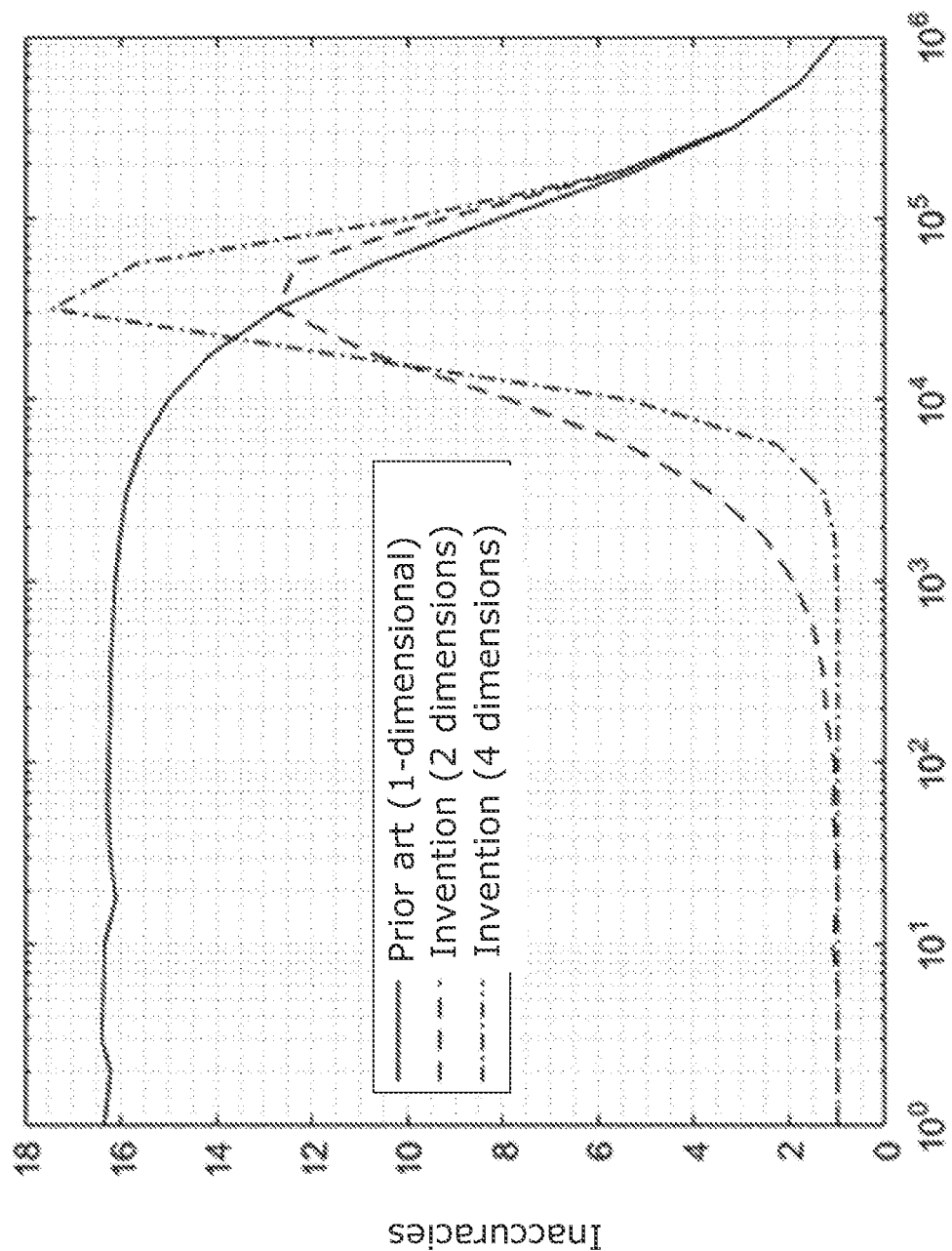
FIG. 7 shows the inaccuracy of the different methods in dependence on the number of differences between $D_A$ und $D_B$, assuming a data base size with $10^6$ entries. The 1-dimensional scheme considers $2^{16}$ partitions. The 2-dimensional scheme considers $2^{15}$ partitions per dimension, and the 4-dimensional scheme considers $2^{14}$ partitions per dimension.
Figure 8:
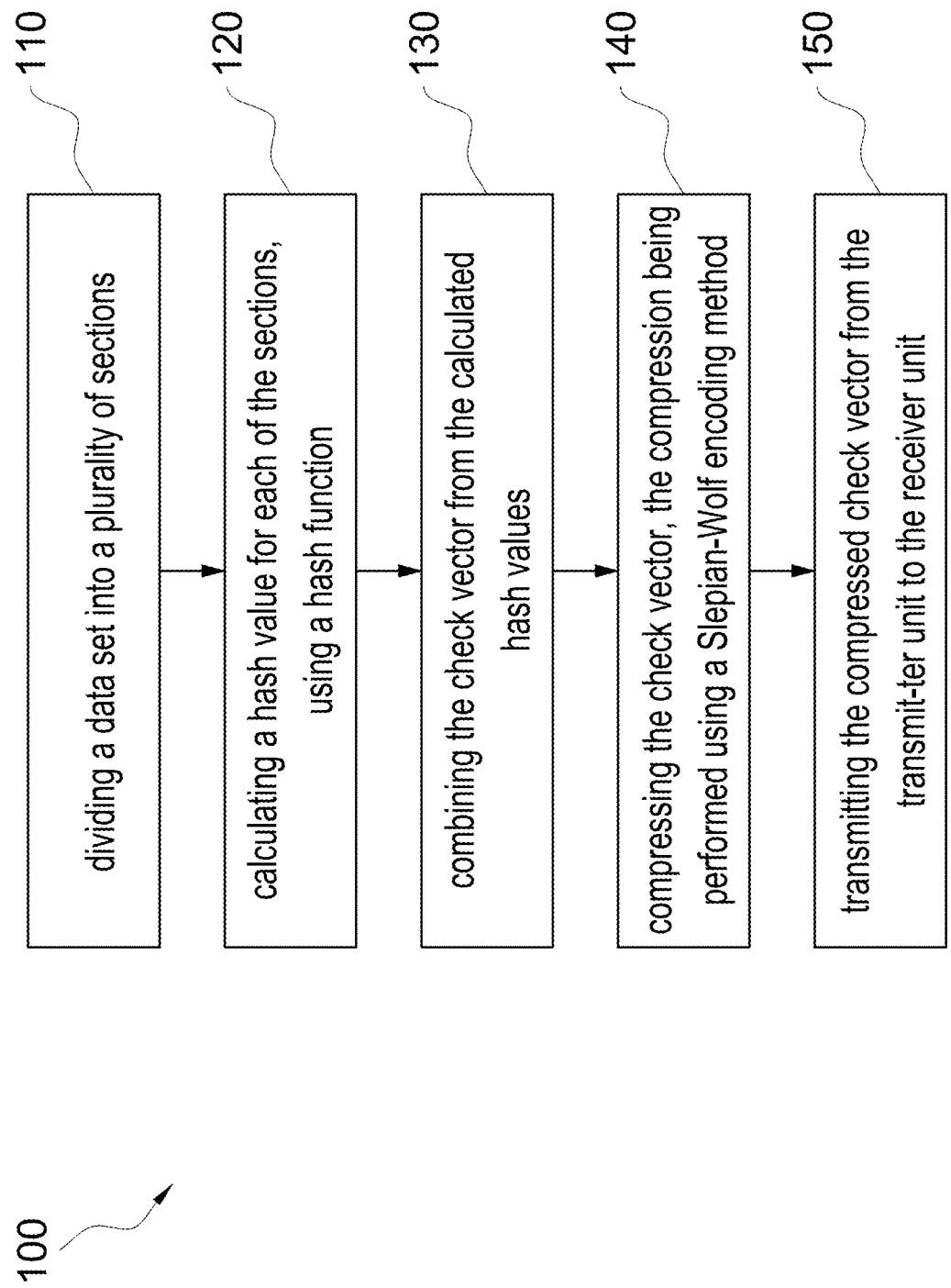
FIG. 8 shows an embodiment of the method 100 according to the invention. In the embodiment illustrated, a data set is divided into a plurality of sections in a first method step 110. The individual sections can have the same size and the same number of entries. As an alternative, the individual parts of the data set can each also have different sizes. In a second method step 120, a hash value is calculated for each of the sections, using a hash function. Here, one of a plurality of hash functions known from prior art can be implemented. In a third method step 130, the check vector is assembled from the calculated hash values. Assembling the check value can be performed, for example, by stringing together the individual hash values. Thereafter, the check vector is compressed in a fourth method step 140, using a Slepian-Wolf encoding method. In particular, a convolutional code or a Low Density Parity Check Code can be used. Finally, the compressed check vector is transmitted from the transmitter unit to the receiver unit in a fifth method step 150.
Figure 9:
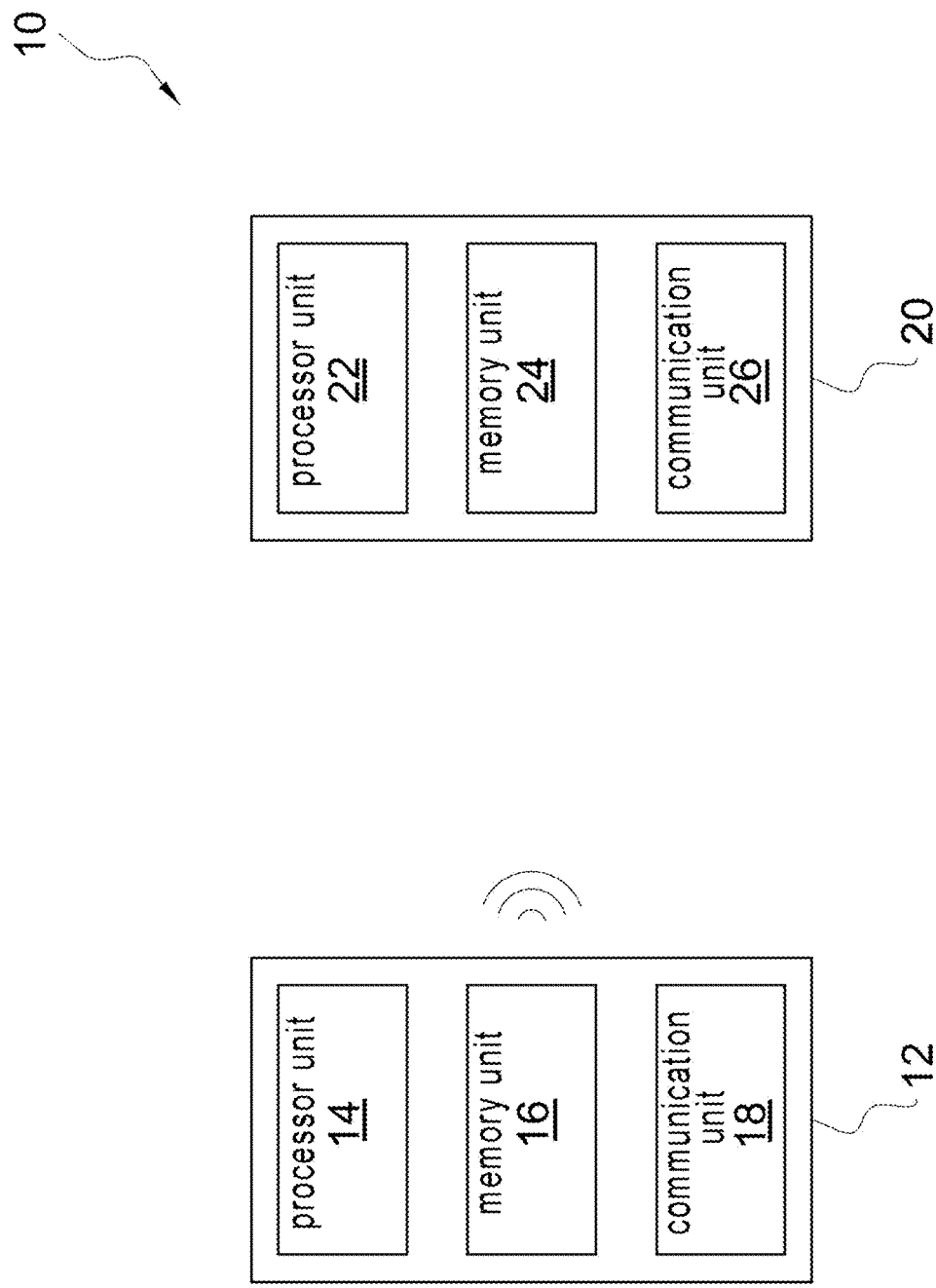
FIG. 9 illustrates an embodiment of a system 10 according to the invention, comprising a transmitter unit 12 and a receiver unit 20. The transmitter unit comprises a processor unit 14, a memory unit 16 and a communication unit 18. The receiver unit 20 also comprises a processor unit 22, a memory unit 24 and a communication unit 26. The transmitter 12 and the communication unit 20 are each configured to execute the method steps described in the context of the method of the present invention.

FIG. 7 illustrates the inaccuracy of the three methods explained above. As can be seen, the methods proposed in the present invention surpass prior art if the number of differences is less than $10^4$, which corresponds to the region in which practically relevant systems operate. If, for example, the number of differences is below 100, the inaccuracy of the method according to the invention is approximately 1 (the best possible), whereas the methods according to prior art show an inaccuracy of 16. Thus, if the potentially inconsistent keys are transmitted once, the present invention reduces the quantity of data to be exchanged by the factor 16.

When comparing the methods with regard to overhead, it can be stated that all three methods calculate a total of $2^{16}$ labels (hash values). The overhead upon exchanging the labels based on a Merkle tree or a Slepian-Wolf approach would thus be similar.

Fields of Application of the Present Invention

The present invention can be used to solve the so-called approximative (distributed) set reconciliation, whose most prominent realizations are redundant replicated data bases such as Amazon Dynamo or Apache Cassandra, to name only a few. Other possible application examples are:
- data bases
- distributed storage
- remote synchronization of files
- peer-to-peer networks (P2P)

LIST OF ABBREVIATIONS

LDPC low-density parity-check

LIST OF REFERENCE NUMERALS

- 10 system
- 12 transmitter unit
- 14 processor unit of the transmitter unit
- 16 memory unit of the transmitter unit
- 18 communication unit of the transmitter unit
- 20 receiver unit
- 22 processor unit of the receiver unit
- 24 memory unit of the receiver unit
- 26 communication unit of the receiver unit
- 100 method
- 110 first method step
- 120 second method step
- 130 third method step
- 140 fourth method step
- 150 fifth method step

LIST OF REFERENCES

[1] A. Demers, D. Greene, C. Hauser, W. Irish, J. Larson, S. Shenker, H. Sturgis, D. Swinehart, and D. Terry, "Epidemic algorithms for replicated database maintenance", *Proceedings of the sixth annual ACM Symposium on Principles of distributed computing*, 1987, pp. 1-12.

[2] J. Cates, "Robust and efficient data management for a distributed hash table", Ph.D. dissertation, Massachusetts Institute of Technology, 2003.

[3] G. DeCandia, D. Hastorun, M. Jampani, G. Kakulapati, A. Lakshman, A. Pilchin, S. Sivasubramanian, P. Vosshall, and W. Vogels, "Dynamo: Amazon's highly available key-value store", *ACM SIGOPS operating systems review*, vol. 41, no. 6, pp. 205-220, 2007.

[4] N. Neeraj, *Mastering Apache Cassandra*. Packt Publishing Ltd, 2015.

[5] R. C. Merkle, "A certified digital signature", *Advances in Cryptology—CRYPTO '89 Proceedings*, G. Brassard, Ed. New York, NY: Springer New York, 1990, pp. 218-238.

[6] D. Slepian and J. Wolf, "Noiseless coding of correlated information sources", *IEEE Trans. Inf. Theory*, vol. 19, no. 4, pp. 471-480, 1973.

[7] A. D. Liveris, Z. Xiong, and C. N. Georghiades, "Compression of binary sources with side information at the decoder using ldpc codes", *IEEE communications letters*, vol. 6, no. 10, pp. 440-442, 2002.

[8] A. W. Eckford and W. Yu, "Rateless slepian-wolf codes", in *Proc. Asilomar conference on signals, systems and computers,* 2005, pp. 1757-1761.

[9] D. Varodayan, A. Aaron, and B. Girod, "Rate-adaptive codes for distributed source coding", *Signal processing*, vol. 86, no. 11, pp. 3123-3130, 2006.

[10] J. Garcia-Frias, "Compression of correlated binary sources using turbo codes", *IEEE Communications letters*, vol. 5, no. 10, pp. 417-419, 2001.

[11] D. Sejdinovic, R. J. Piechocki, and A. Doufexi, "Rateless distributed source code design", in *Proceedings of the 5th International ICST Mobile Multimedia Communications Conference,* 2009, pp. 1-7.

[12] M. Fresia and L. Vandendorpe, "Distributed source coding using raptor codes", in *IEEE GLOBECOM 2007—IEEE Global Telecommunications Conference*. IEEE, 2007, pp. 1587-1591.

[13] P. Tan and J. L. Tiffany, "A general and optimal framework to achieve the entire rate region for slepian-wolf coding", *Signal Processing*, vol. 86, no. 11, pp. 3102-3114, 2006.

[14] E. Arikan, "Polar coding for the slepian-wolf problem based on monotone chain rules", in *2012 IEEE International Symposium on Information Theory Proceedings*. IEEE, 2012, pp. 566-570.

The invention claimed is:

1. A method for transmitting consistency information for verifying distributed database replicas, the method comprising:
dividing a data set into a plurality of sections based on a partitioning function;
calculating a hash value for each section using a hash function;
generating a check vector by concatenating the hash values of the sections;
compressing the check vector by calculating a syndrome using a linear code, wherein the syndrome is calculated as $s=H \times u^t$, where H is a parity check matrix and u is the check vector, the compression being performed using a Slepian-Wolf encoding method; and
transmitting the compressed check vector and the syndrome to a receiver unit over a communication channel to enable the receiver unit to identify inconsistencies between the distributed database replicas based on the syndrome and local side information.

2. The method according to claim 1, wherein the compression of the check vector is performed using a distributed source code at a fixed information rate, and in particular using a convolutional code, a turbo code, a Low Density Parity Check Code, or a polar code.

3. The method according to claim 2, wherein
the compression of the check vector is performed using a Low Density Parity Check Code, LDPC;
the compression of the check vector comprises the calculation of a syndrome according to $s=H\ u^T$, where H is the control matrix, u describes the check vector, and $(\bullet)^T$ is the transposed matrix; and
wherein the syndrome s is transmitted from the transmitting unit to the receiver unit.

4. The method according to claim 1, wherein the compression of the check vector is performed using a rate-compatible source code.

5. The method according to claim 1, wherein the compression of the check vector is performed using a Low Density Parity Check Code, wherein, first, a first syndrome s is transmitted from the transmitting unit to the receiver unit, and the transmitter unit transmits additional syndrome bits to the receiver unit, if the receiver unit is unable to reconstruct the data base of the transmitter unit using the received syndrome bits.

6. The method according to claim 5, wherein the transmission of additional syndrome bits from the transmitter unit to the receiver unit is repeated until the receiver unit is able to reconstruct the data base of the transmitter unit.

7. The method according to claim 1, wherein the encoding is based on an information rateless encoding, and the transmitter unit continuously sends redundancy information to the receiver unit, and does so preferably until the receiver unit is able to reconstruct the data base of the transmitter unit.

8. The method according to claim 7, wherein the transmission of additional syndrome bits from the transmitter unit to the receiver unit is repeated until the receiver unit is able to reconstruct the data base of the transmitter unit.

9. A method for reconstructing consistency information in a distributed database system comprising:
receiving, by a receiver unit, a compressed check vector and a syndrome over a communication channel from a transmitter unit, the compressed check vector generated from a data set partitioned into a plurality of sections based on a partitioning function and compressed based on a Slepian-Wolf encoding method; and
generating a local check vector by dividing a corresponding local data set replica into a plurality of sections and calculating a hash value for each section using a hash function;
decoding the syndrome using the local check vector as side information to obtain an error vector; and
identifying inconsistent sections between the local data set replica and the data set at the transmitter unit based on the error vector.

10. The method according to claim 9, wherein the compressed check vector is decompressed using a Low Density Parity Check Code decoding method.

11. A method for transmitting consistency information for verifying distributed database replicas, the method comprising:
dividing the data set into a plurality of sections;
along a plurality of dimensions based on at least one partitioning function;
calculating a hash value for each of the sections, using a hash function;
generating a check data set by assembling the hash values of the sections according to the plurality of dimensions;

compressing the check data set by calculating a syndrome using a linear code, wherein the syndrome is calculated as $s = H \times u^t$, where H is a parity check matrix and u is the check data set; and transmitting the compressed check data set and the syndrome to a receiver unit over a communication channel to enable the receiver unit to identify inconsistencies between the distributed database replicas based on the syndrome and local side information.

12. The method according to claim 11, wherein combining the check data set comprises building a Merkle tree data structure, the calculated hash values representing the leaf nodes of the Merkle tree data structure.

13. The method according to claim 11, wherein combining the check data set comprises the generation of a plurality of Merkle tree data structures, where one Merkle tree data structure is generated for each dimension.

* * * * *

UNITED STATES PATENT AND TRADEMARK OFFICE
CERTIFICATE OF CORRECTION

PATENT NO. : 12,463,665 B2
APPLICATION NO. : 18/423543
DATED : November 4, 2025
INVENTOR(S) : Francisco Lázaro Blasco Page 1 of 1

It is certified that error appears in the above-identified patent and that said Letters Patent is hereby corrected as shown below:

In the Claims

Column 18, Line 39, Claim 9, delete "system" and insert -- system, the method --

Column 18, Line 61, Claim 11, delete "sections;" and insert -- sections --

Signed and Sealed this
Thirtieth Day of December, 2025

John A. Squires
*Director of the United States Patent and Trademark Office*